INVENTOR.
HORST LUCAS

United States Patent Office 3,432,023
Patented Mar. 11, 1969

3,432,023
APPARATUS FOR TURNING A BOX ON A CONVEYOR
Horst Lucas, Bochum, Germany, assignor to Gebr. Eickhoff, Maschinenfabrik und Eisengiesserei m.b.H., Bochum, Germany, a corporation of Germany
Filed Apr. 24, 1967, Ser. No. 633,143
Claims priority, application Germany, May 12, 1966, E 31,652
U.S. Cl. 198—33          2 Claims
Int. Cl. B65g 47/24

ABSTRACT OF THE DISCLOSURE

Described is apparatus for rotating rectangular boxes and the like, moving along a conveyor, through a 90° arc. This is accomplished by means of a hook, rotatable about a stationary axis, which engages one edge of the box, together with a chain-driven dog which engages the diagonally opposite edge of the box to rotate it through the aforesaid arc of 90°.

Background of the invention

Figure 2:
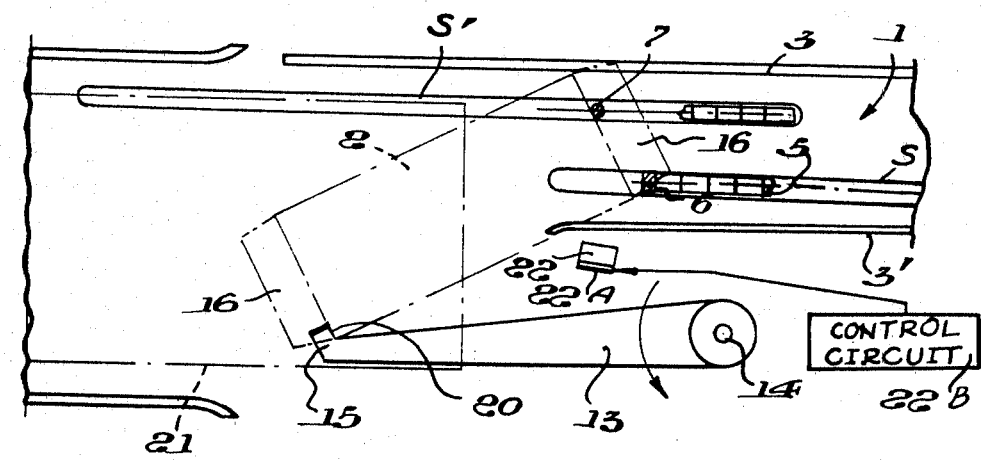

While not limited thereto, the present invention is particularly adapted for use in packaging apparatus wherein three side edges of the cover for a filled box must be glued to the side walls of the box as it moves along a conveyor. In such applications, it is necessary to pass the box through a sealing device which presses one or more edges of the cover against one or more of the opposite side walls of the box, thereafter rotate the box through an arc of 90°, and finally pass the box through a second sealing device which presses the remaining two edges of the box against the remaining parallel side walls which are at right angles to the first-mentioned side walls. The provision of such apparatus is not a simple problem, particularly when it is remembered that the box must continue to travel along a continuous line of motion as it is turned through an arc of 90°.

Summary of the invention

As an overall object, the present invention seeks to provide a device capable of turning individual boxes, which are moving continuously along a conveyor, through an arc of 90° without interrupting their translational movement through the conveyor.

More specifically, an object of the invention is to provide a device for turning individual boxes through an arc of 90° whereby the three side edges of the box may be glued and pressed against the box walls while the box moves continuously along a conveyor.

In accordance with the invention, there is provided apparatus for turning a rectangular box as it moves along a conveyor comprising a generally vertical guideway adjacent a side of the conveyor and along which the box slides as it travels along the conveyor, arm means at the other side of the conveyor, the arm means extending along the length of the conveyor and being rotatable about a generally vertical axis, a hook on the end of the arm means opposite its axis of rotation, the hook projecting into the path of travel of the box and being adapted to engage an edge of the box as it travels along the conveyor, spring means for resiliently urging the arm means to rotate in one direction about its vertical axis to project the hook into the path of travel of the box, and means diagonally opposite the edge of the hook as it engages the box from moving the diagonally opposite edge of the box forwardly along its path of travel to thereby rotate the box through an arc of 90° about its point of engagement with the hook.

Preferably, the means diagonally opposite the edge of the hook for rotating the box comprises a dog carried on a drive chain. The frictional forces between the dog and the box being turned, which are basically caused by the spring tension on the hook, can result in rotation of the box exceeding 90°, particularly in the case of square boxes of great length. In order to prevent this condition, a pressure bar is preferably provided above the box which braces the box between the pressure bar and the surface of the conveyor on which the box moves such that the frictional forces which occur between the box's front surface and the dog have no effect on the box's rotation. In this manner, rotation of the box in excess of 90° is eliminated.

Figure 1:
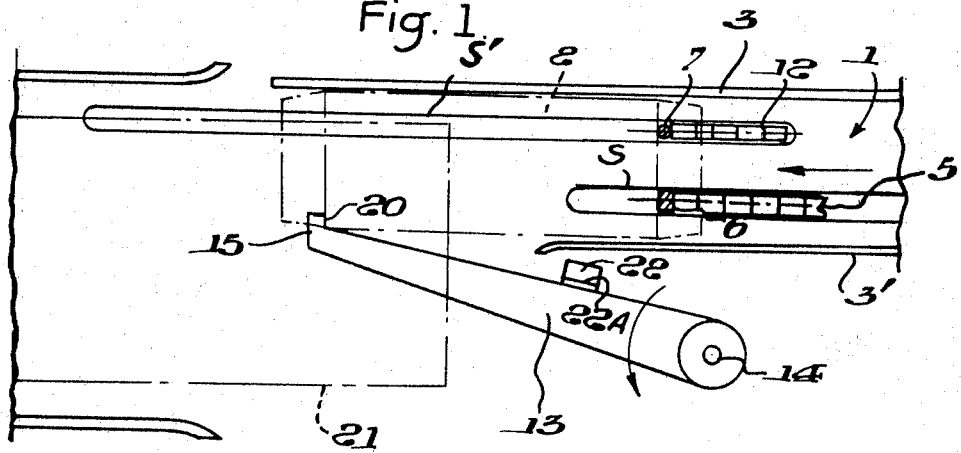
Figure 3:
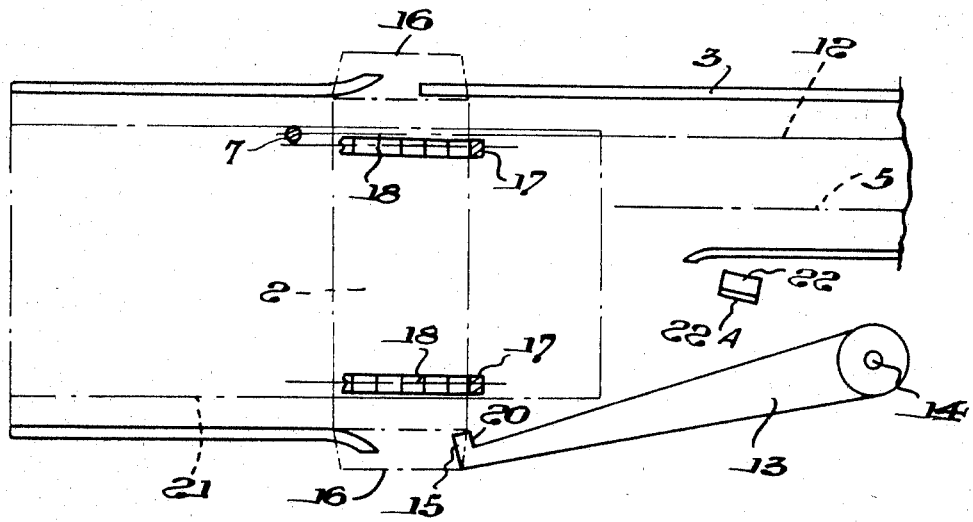
Figure 5:
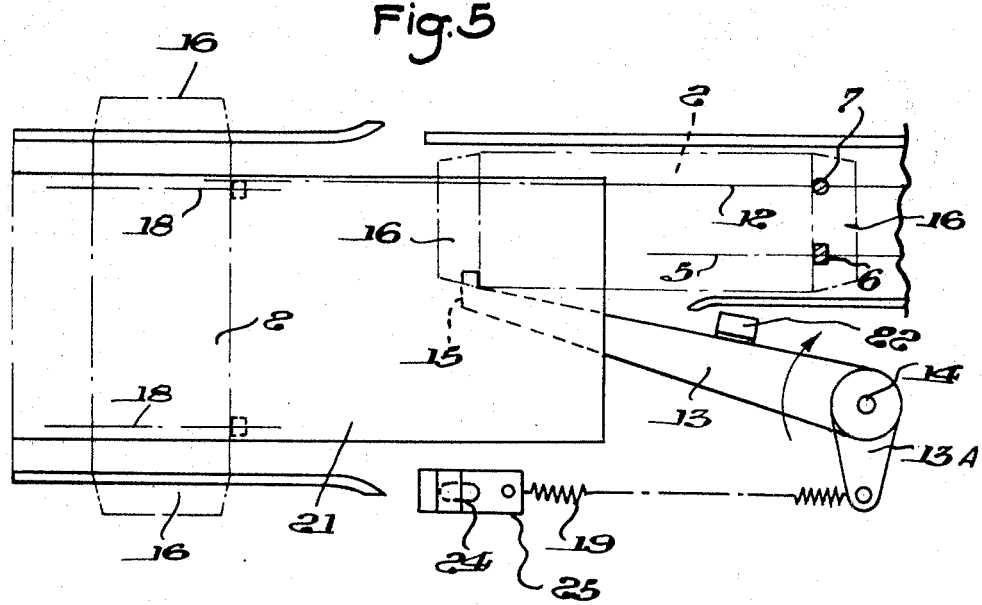
Figure 4:
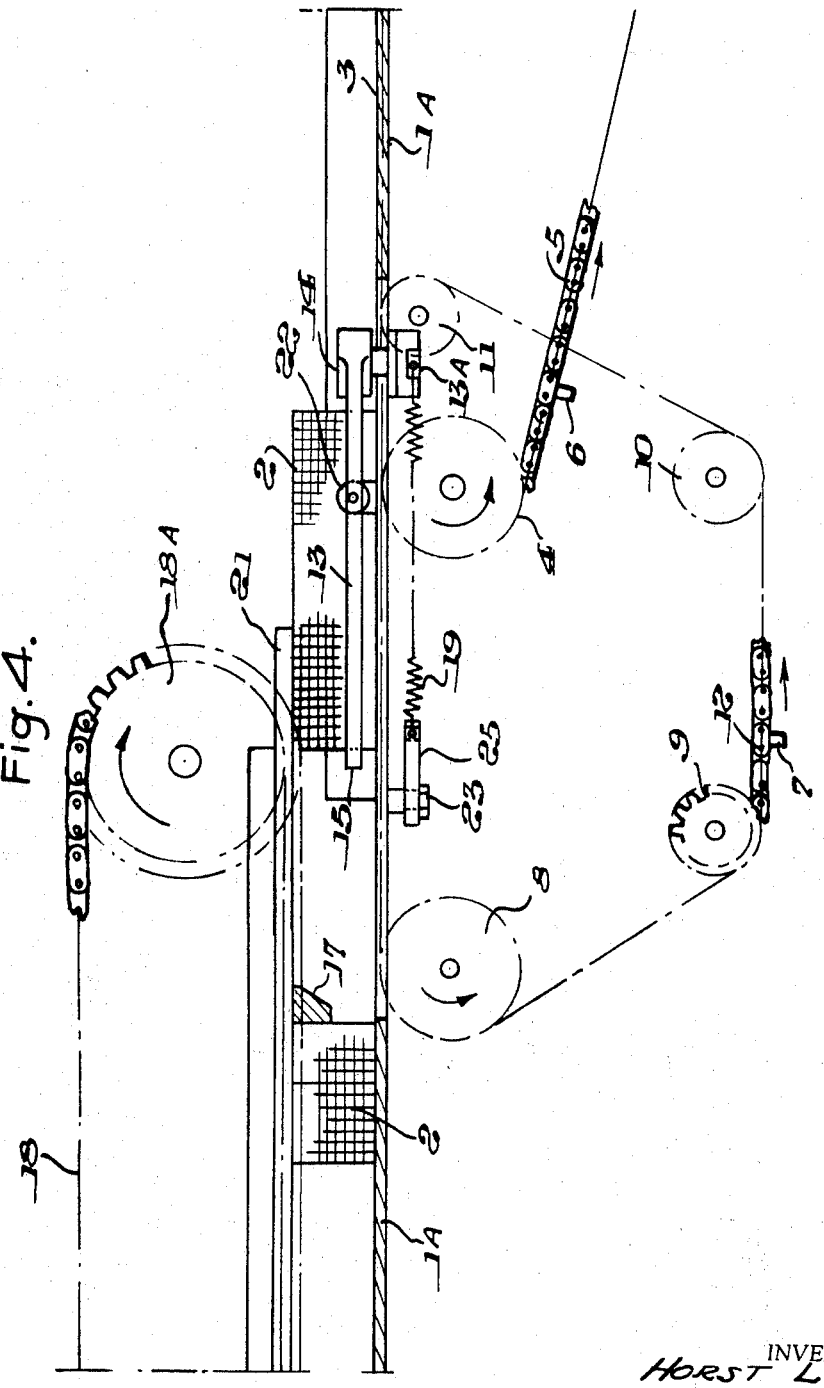

The above and other objects and features of the invention will become apparent from the following detailed description taken in connection with the accompanying drawings which form a part of this specification, and in which:

FIGURES 1, 2 and 3 schematically illustrate the steps involved in rotating a box through 90° in accordance with the teachings of the invention;

FIG. 4 is a schematic side view of the apparatus for accomplishing the steps shown in FIGS. 1–3; and FIG. 5 is a top view of the apparatus of FIG. 4.

With reference now to the drawings, and particularly to FIGS. 1, 2 and 3, a box to be rotated is schematically illustrated by the reference numeral 2. As shown, the long transverse dimension of the box extends along its path of travel. The box is moved along the floor of a conveyor 1 by means of a dog 6 carried on a chain 5, hereinafter described in detail. As the box 2 travels along the conveyor 1, it passes between guideways 3 and 3', the guideway 3 being longer than guideway 3' as shown. Adjacent the guideway 3' is an arm 13 which extends along the path of travel of the box 2 and is rotatable about a generally vertical pivot point or axis 14. At the free end of the arm 13 is a hook 15 having a surface 20 which, in the position shown in FIG. 1, extends perpendicular to the direction of movement of the box along the conveyor 1. This surface 20 engages one edge of the box 2 as it travels along the conveyor.

As was mentioned above, the box 2 is normally moved along the conveyor 1 by means of a dog or projection 6 which extends upwardly from a chain, schematically illustrated by the reference numeral 5 and hereinafter described in detail. Adjacent the chain 5 is a second chain 12 which moves at a greater rate of speed than the chain 5 and carries a second dog 7 which engages the edge of the box 2 diagonally opposite the edge engaged by the hook 15. The movement of the dogs 6 and 7 is synchronized such that when the forward edge of the box engages the hook 15, the dog 7 will engage the diagonally opposite edge of the box. Since the dog 7 is moving at a greater rate of speed than the dog 6, it will cause the box to move outwardly and away from the dog 6 as shown in FIG. 2. At the same time, since the forward edge of the box is restrained by the hook 15, the box will rotate in a counterclockwise direction as viewed in FIG. 2, thereby causing the arm 13 to move outwardly away from conveyor 1 about the axis 14.

This action will continue until the box reaches the position shown in FIG. 3 where it has been rotated through a complete 90° arc. Note that in the position shown in FIG. 3, the dog 7 has passed beyond the box 2. This means, of course, that the box must move downwardly as viewed in FIG. 3 to permit the dog 7 to pass. The arm 13, however, is spring loaded and urged to rotate in a clockwise direction such that it will permit the box 2 to move downwardly and permit the dog 7 to pass, whereupon the spring-loaded arm 13 will then force the box into engagement with guideway 3.

After the box is thus turned, dogs 17 (FIG. 3) carried on chains 18 above the conveyor 1 engage the rear edge of the box and force it to the left, whereupon the side edges or flaps 16 of the box may be glued and pressed against its sides to complete the forming operation. Thus, the box is rotated through 90° and then conveyed along its original path of travel, all of this occurring while the box continues its forward path of motion.

With reference, now, to FIGS. 4 and 5, successive dogs 6 are carried on the chain 5 which rotates about sprocket wheel 4 and other sprocket wheels, not shown. As will be understood, one of the sprocket wheels about which the chain passes is driven by a suitable prime mover in order to advance the upper reach of the chain 5 to the left as viewed in FIG. 4. The floor 1A of the conveyor 1 is provided with an elongated slot S (FIGS. 1 and 2) through which the dogs 6 pass while the chain 5 passes beneath the floor 1A. Successive ones of the dogs 7 are likewise carried on the chain 12 which rotates about sprocket wheels 8, 9, 10 and 11, one of said sprocket wheels being driven by a suitable prime mover, not shown. The dogs 7 pass through a slot S' (FIGS. 1 and 2) in the floor 1A of the conveyor 1 and engage the upper right-hand edge of the box. The chain 12, of course, moves at a greater rate of speed than the chain 5 such that the box may be pulled away from the dogs 6 during a turning operation.

Above the boxes 2 in their area of rotation is a pressure bar or plate 21 which is adjustable by means, not shown, to accommodate boxes of various sizes. As can be seen, the forward edge of the box 2 passes beneath the pressure plate 21 as it is being rotated; and this prevents rotation of the box through an arc greater than 90° which would occur, for example, if the box were not frictionally restrained between the pressure plate 21 and the floor 1A of conveyor 1. That is, since the dogs 7 must pass beyond the box 2 as shown in FIG. 3, this action, without the pressure plate 21, could cause the box to become skewed across the coneyor. However, with the pressure plate 21, the box simply moves downwardly as viewed in FIG. 3 as the dog 7 passes, whereupon the arm 13, being spring loaded, forces it backwardly against the guideway 3.

As best shown in FIGS. 4 and 5, the arm 13 is connected to a shorter arm 13A. The arm 13A, in turn, is connected through a tension spring 19 to a plate 25 having an oblong opening 24 therein such that its position may be adjusted by loosening and thereafter tightening bolts 23 (FIG. 4). Thus, the tension on the spring 19 and the force imparted by the arm 13 may be adjusted by adjusting the position of the plate 25.

When the arm 13 moves inwardly under the force of spring 19, it will engage a stop 22. Under certain circumstances, engagement of the arm 13 against the stop 22 will cause a bouncing action; and this, of course, is undesirable. Accordingly, an electromagnet 22A may be positioned on one face of the stop 22 to thereby prevent such bouncing condition. The electromagnet is controlled by an electrical control circuit 22B (FIG. 2) such that it is energized only when the arm 13 swings inwardly, and is thereafter deenergized as soon as the arm is securely in engagement with stop 22 to eliminate any bouncing action.

With specific reference to FIG. 4, it can be seen that the dogs 17 are carried on a chain 18 which rotates about a sprocket 18A above the pressure plate 21. The dogs 17, of course, pass through slots in the pressure plate 21 such that they may engage a box and move it along the conveyor 1 to a succeeding station where the edges or flaps 16 of the box may be glued and pressed against its sides.

I claim as my invention:

1. Apparatus for turning a rectangular box as it moves along a conveyor, comprising a generally vertical guideway adjacent to a side of a conveyor and providing means along which a rectangular box may slide as it travels along said conveyor, arm means at the other side of said conveyor, said arm means extending along the path of travel of a box being conveyed by said conveyor and said arm means being rotatable about a generally vertical axis, a hook on the end of said arm means that is remote from the axis of rotation of said arm means, said hook projecting into said path of travel and being adapted to engage an edge of a box as it travels along said conveyor, spring means for resiliently urging said arm means to rotate in one direction about its vertical axis to project said hook into said path of travel, means diagonally opposite the edge of said hook as it engages a box for moving the edge of such box forwardly against said hook to thereby rotate such box through an arc of 90°, and a pressure plate above said conveyor and located to engage the upper surface of a box as it is being rotated to thereby prevent the rotation of the box through an arc greater than 90°.

2. Apparatus according to claim 1 and including a stop for limiting the movement of said arm means toward the conveyor, and a magnet on the stop for preventing bouncing of the arm on the stop.

References Cited

UNITED STATES PATENTS

| | | | |
|---|---|---|---|
| 2,667,959 | 2/1954 | Rogers | 198—33 |
| 2,775,333 | 12/1956 | Hayes | 198—33 |
| 3,165,193 | 1/1965 | Stevenson | 198—33 |
| 3,306,424 | 2/1967 | Fahrenbach | 198—33 |
| 3,310,187 | 3/1967 | Barker et al. | 198—33 |

RICHARD E. AEGERTER, *Primary Examiner.*